UNITED STATES PATENT OFFICE.

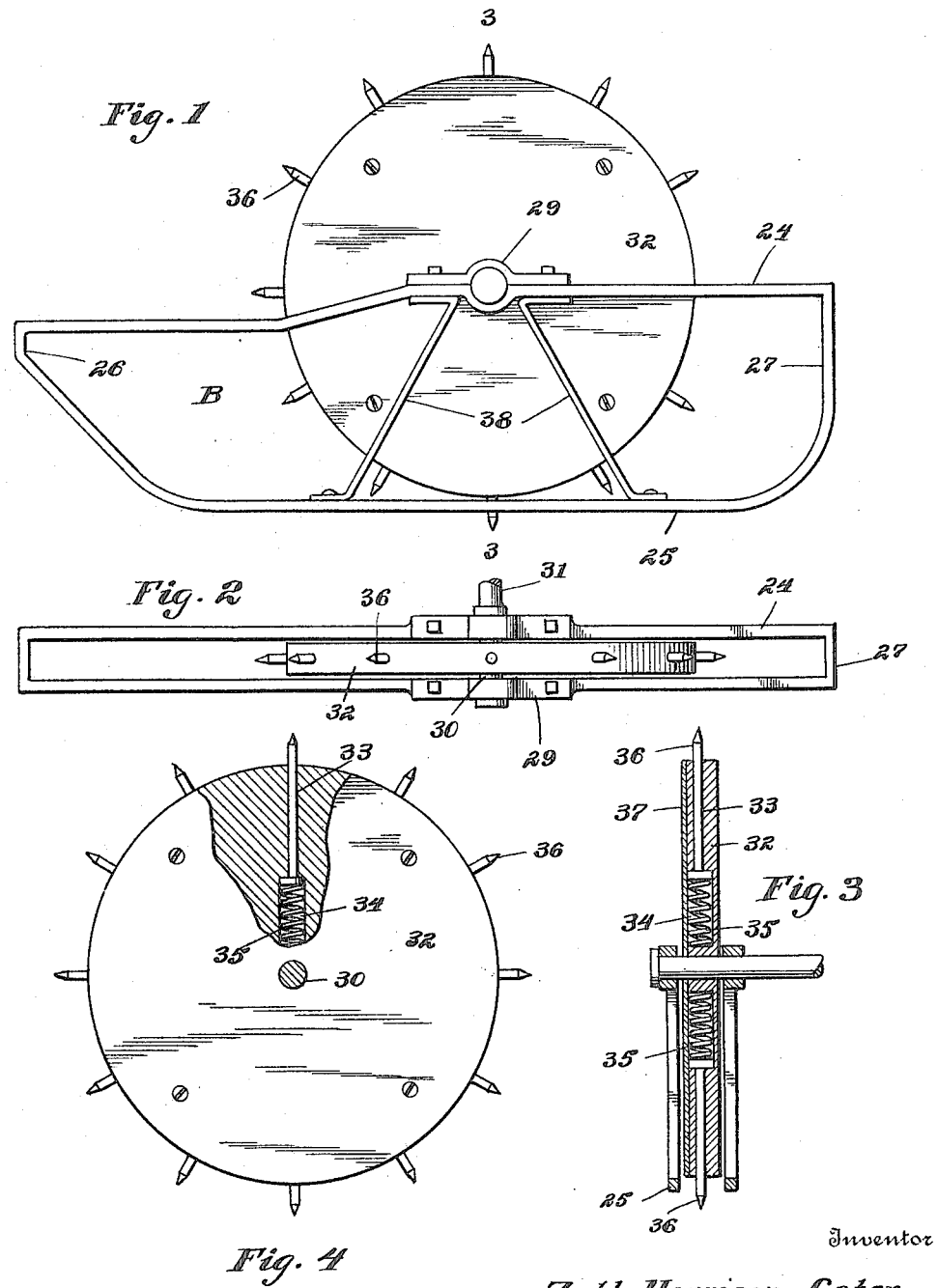

ZETH HARRISON CATON, OF MATTOON, ILLINOIS.

SLEIGH-RUNNER FOR AUTOMOBILES.

1,164,574. Specification of Letters Patent. Patented Dec. 14, 1915.

Application filed April 27, 1915. Serial No. 24,310.

*To all whom it may concern:*

Be it known that I, ZETH HARRISON CATON, a citizen of the United States, residing at Mattoon, in the county of Coles and State of Illinois, have invented new and useful Improvements in Sleigh-Runners for Automobiles, of which the following is a specification.

This invention relates to sleigh runners and propulsion wheels for automobiles and motor vehicles.

The invention has for its object to produce sleigh runners of simple and improved construction adapted to be mounted on the axle of an automobile or motor vehicle in connection with a spiked propulsion wheel, whereby the vehicle may be propelled.

A further object of the invention is to produce rear runners of special construction to coöperate with the spiked propulsion wheels.

A further object of the invention is to simplify and improve the construction of the spiked propulsion wheels.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings, Figure 1 is a side elevation of the rear runner with the propulsion wheel in place, showing the same mounted for operation. Fig. 2 is a top plan view of the same. Fig. 3 is a vertical sectional view taken on the line 3—3 in Fig. 1. Fig. 4 is a side view of the propulsion wheel, the face plate being partly broken away.

Corresponding parts in the several figures are denoted by like characters of reference.

The runner B which is adapted to be used as a rear runner is composed of two runner-shaped frames, each having a top bar 24, a bottom bar 25 and front and rear bars 26, 27 which merge with the bottom bar, as shown, presenting a runner-shaped appearance. Each top bar 24 is provided with a recess 28 and with a cap 29 fitting thereover, said recesses and caps affording bearings for the spindle 30 of the rear axle 31 which is driven in the customary manner, said spindle carrying also intermediate the runner frames a propulsion wheel 32 which is fixed on the axle so as to be driven thereby. Said propulsion wheel is provided with a plurality of radial bores 33, the inner ends of which are enlarged to form chambers or housings 34 in which coiled springs 35 are placed for the purpose of forcing outwardly the spikes 36 which are fitted in the respective bores. The wheel 32 also includes a detachable face plate 37 for the purpose of affording access to the spikes and the springs in the case of needed repairs. The frames of the rear runners B are securely connected together by braces 38 which are so arranged as not to interfere with the free rotation of the wheel.

When suitable front runners and rear runners constructed as herein described, each of said rear runners equipped with a propulsion wheel, are applied to an automobile or motor vehicle in place of the customary front and rear wheels, said vehicle is thereby adapted to travel over snow and icy surfaces, the spikes of the propulsion wheels being retracted by contact with the ground, so as not to interfere with the rotation of the wheel, but not sufficiently to prevent said spikes from biting firmly into the ground, thereby propelling the vehicle, as will be readily understood. The improved automobile runners and propulsion wheels may be produced at a moderate expense and may be easily and quickly applied to a motor vehicle which will thereby be adapted for use on snowy and icy ground when the wheels ordinarily used would be ineffective.

Having thus described the invention, what is claimed as new, is:—

An automobile runner comprising a pair of runner frames and an intermediately disposed propulsion wheel, said wheel having radial bores enlarged to form housings at their inner ends, spikes fitted in said bores, and spike projecting springs arranged in the housings, said wheel having a detachable face plate to afford access to the spikes and springs.

In testimony whereof I affix my signature in presence of two witnesses.

ZETH HARRISON CATON.

Witnesses:
WILLIAM E. McGLASSON,
F. H. SPIDELL.

Copies of this patent may be obtained for five cents each, by addressing the "Commissioner of Patents, Washington, D. C."